(12) United States Patent
Smith

(10) Patent No.: US 6,739,064 B1
(45) Date of Patent: May 25, 2004

(54) SETUP GAGE

(75) Inventor: Todd A. Smith, Ft. Wayne, IN (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/157,962

(22) Filed: May 31, 2002

(51) Int. Cl.[7] .............................................. G01D 21/00
(52) U.S. Cl. ........................................... 33/613; 33/645
(58) Field of Search ....................... 33/613, 645, 501.7, 33/501.12, 501.14, 501.16, 542, 548, 567, 549, 562, 520, 644

(56) References Cited

U.S. PATENT DOCUMENTS

| | | | | |
|---|---|---|---|---|
| 2,132,583 A | * | 10/1938 | Skogsberg | .................... 33/644 |
| 3,031,765 A | * | 5/1962 | Muller | .................... 33/501.13 |
| 3,657,940 A | * | 4/1972 | Wagner | ....................... 74/397 |
| 4,744,153 A | | 5/1988 | Brand | |
| 4,793,068 A | * | 12/1988 | Golkar | ......................... 33/526 |
| 5,003,702 A | * | 4/1991 | Han | .......................... 33/501.19 |
| 5,261,372 A | * | 11/1993 | Traeger et al. | .............. 123/357 |
| 5,307,676 A | | 5/1994 | Gutman | |
| 5,373,735 A | | 12/1994 | Gutman | |

* cited by examiner

*Primary Examiner*—Diego Gutierrez
*Assistant Examiner*—Amy R Cohen
(74) *Attorney, Agent, or Firm*—Liniak, Berenato & White

(57) ABSTRACT

An apparatus designed to set up gear testers and lappers for both above and below center engaged hypoid gear sets. The set-up gage includes a pinion stem and a gage body. The gage body has at least two sets of surfaces to properly position a simulated ring gear within the gear tester for each of the above and below center engaged hypoid gear set arrangements.

13 Claims, 4 Drawing Sheets

SETUP GAGE

BACKGROUND OF THE INVENTION

1. Field of the Invention

The present invention relates to a setup gage. More specifically, the present invention relates to a setup gage to facilitate a machine set-up for testing hypoid gears in both above and below center hypoid gear arrangements.

2. Description of Related Art

Hypoid gears and pinion gears are machined with very strict tolerances. In order to determine whether the tolerances between the drive pinion gear and the hypoid gear are acceptable, a gear tester and lapper is used to test the gear set as is known in the art. Because hypoid gears and pinion gears vary in size, various combinations of varying size gears require that the gear tester and lapper be properly positioned for a given array of gears.

Thus, prior to testing the actual hypoid (or ring) gear and drive pinion gear, the gear tester and lapper must be properly calibrated with the appropriate distances. Because hypoid gear set uses a hypoid gear that meshes with a drive pinion gear either below or above the centerline of the pinion gear (thus the pinion gear will engage the hypoid gear either above its centerline or below its centerline depending on the application environment) an environment specific set-up gage is required to properly position the gear tester and lapper prior to testing the actual drive pinion gear and ring gear. Because of the various combinations of hypoid gear and pinion gear arrays, several set-up gages must be maintained within an inventory, one set-up gage for each array. Once an array is chosen, it must further be determined whether the hypoid gear will be positioned above the centerline of the pinion shaft, or below the centerline. Hereagain a separate set-up gage is required to position the lapper and gear tester for each arrangement where the pinion gear engages the hypoid gear above and below centerline Once the particular arrangement is identified a set-up gage specifically designed for either above or below centerline applications is employed. The set-up gage is placed within the gear tester and lapper. The simulated hypoid gear is then positioned relative the pinion stem by the faces of the set-up gage's body. The set-up gage is designed to represent the drive pinion gear, and together with the simulated hypoid gear the actual gear set is simulated and the tester and lapper are positioned/calibrated to test the specific gear set arrangement. Once the critical relative distances have been determined, and the tester and lapper properly calibrated, the simulated hypoid gear and the set-up gage are replaced with the actual hypoid gear and drive pinion gear to be tested. The testing may then commence and the tolerances of the hypoid gear and drive pinion gear measured.

The prior art includes a set-up gage 100 for use with a hypoid gear tester as best seen in FIGS. 1–3. The set-up gage includes a pinion stem 110 with a series of precision ground, polished surfaces 120. The surfaces 120 allow the gage 100 to seat on precision ground surfaces of the tooling collet when inserted within the hypoid gear tester and lapper. Affixed to the end of the pinion stem 110 is the set-up gage body 130. The set-up gage body 130 has orthogonal surfaces 140, 150 and 160 used to position the simulated hypoid gear to facilitate subsequent positioning of the gear tester. Pads 140*a*, 150*a*, and 160*a* are secured to the set-up gage's surfaces 140, 150 and 160 respectively in order to ensure the proper offset distances are used for the simulated hypoid gear 80 and that of the gear tester. Heretofore, separate set up gages were required for applications where the pinion gear engages the hypoid gear above and below the centerline.

Other prior art testing devices include a gear tester method and an apparatus for inspecting the contact area between a hypoid gear and a pinion. The gear tester includes an apparatus for inspecting the contact area between selected tooth surfaces of a spiral bevel or hypoid gear relative to selected gear tooth surfaces of a second gear such as a pinion.

Additionally, it is also known to have a gear testing machine for evaluating the performance of a set of gears. The machine includes a platform for mounting a pinion gear relative to the pinion through actuators attached to a frame so that the gears may be positioned at a desired location relative to the pinion spindle axis to compensate for errors in mounting as well providing accurate mounting in accordance with required mounting criteria.

The aforementioned prior art fails to provide a machine or device to set up the alignment of a gear tester and lapper to accommodate both an above and a below center hypoid gear arrangement with a single set up gage. In the prior art, two separate set up gauges are required to properly set a testing machine for an above center front hypoid gear arrangement as well as a below center rear hypoid gear arrangement. Thus, gage inventory is increased via the necessity of having more than one gage for the multiple arrangements of the hypoid and pinion gears.

Similarly, the cost associated with testing the aforementioned gears also increases, requiring more than one gage to be kept within an inventory. Gages with a single purpose reduce the flexibility of the inventory ultimately rising costs as previously stated.

SUMMARY OF THE INVENTION

It is therefore an advantage of the present invention to provide a set-up gage for performing a machine set-up for both above and below the center hypoid gear designs, where the set-up gage includes a gage body and a pinion stem. The pinion stem is integrally attached to the gage body. The gage body provides a first set of surfaces and a second set of surfaces to position a ring gear, or simulated ring gear, relative to the pinion stem. The first set of surfaces is adapted to position the ring gear in an above center hypoid gear design, while the second set of surfaces is adapted to position the ring gear in a below center hypoid gear design.

These advantages and other novel features of the present invention will become apparent in the following detailed description of the invention when considered in conjunction with the accompanying drawings.

BRIEF DESCRIPTIONS OF THE DRAWINGS

A better understanding of the present invention will be had when reference is made to the accompanying drawings, wherein identical parts are identified by identical reference numbers and wherein.

DETAILED DESCRIPTION OF THE PRESENT INVENTION

The features of the invention as explained above provide a single set-up gage for both above and below center hypoid gear arrangements.

Figure 1:
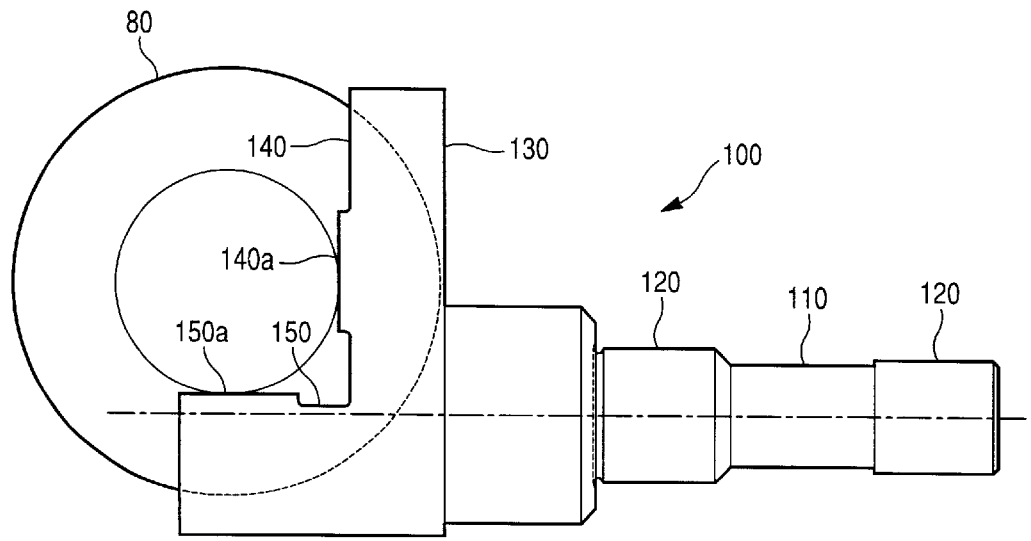
FIG. 1 is a top view of the existing set up gage for below center hypoid gear arrangement.
Figure 2:
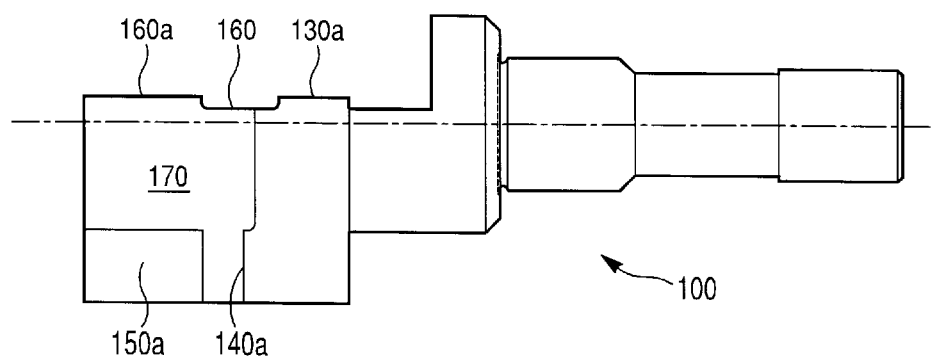
FIG. 2 is a side view of the existing set up gage for below center hypoid gear arrangement.
Figure 3:
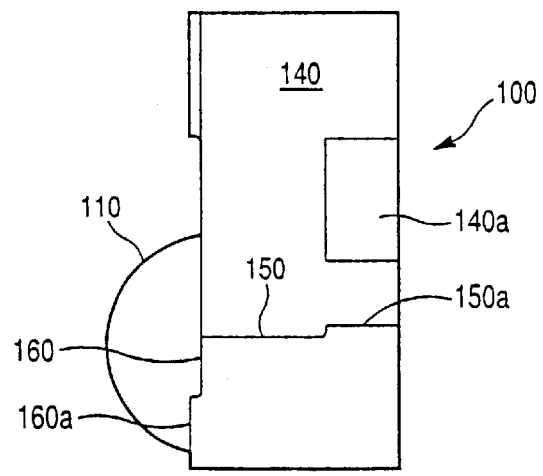
FIG. 3 is a frontal view of the existing set up gage for below center hypoid gear arrangement.
Figure 4:
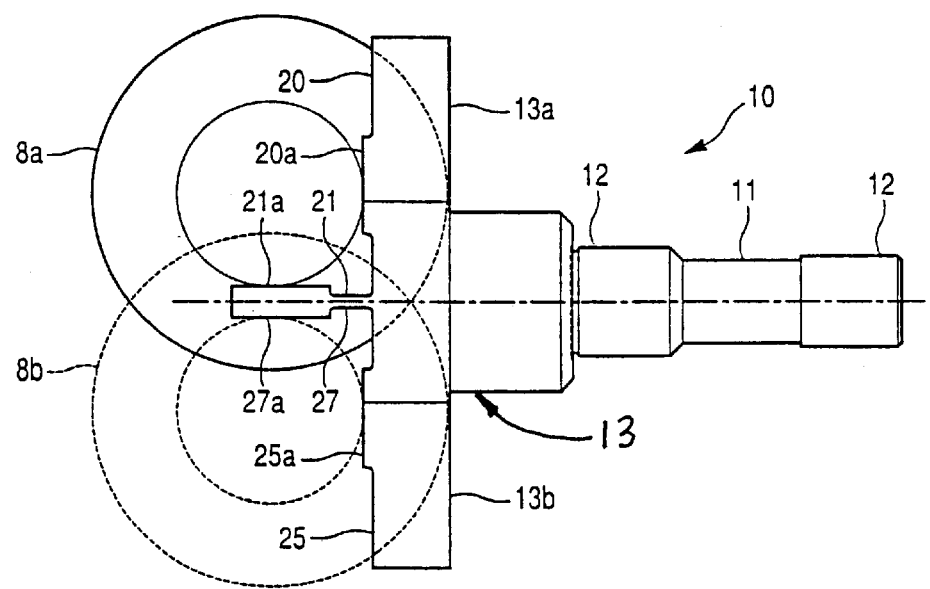
FIG. 4 is a top view of the present invention.
Figure 5:
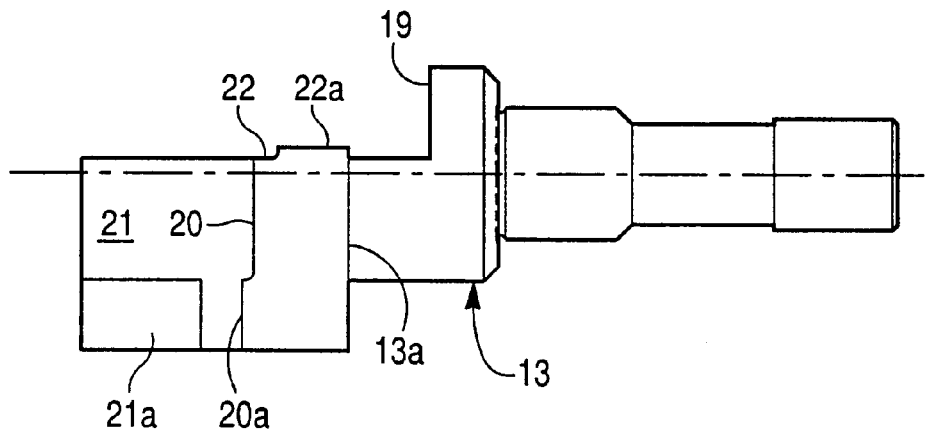
FIG. 5 is a side view of the present invention.
Figure 6:
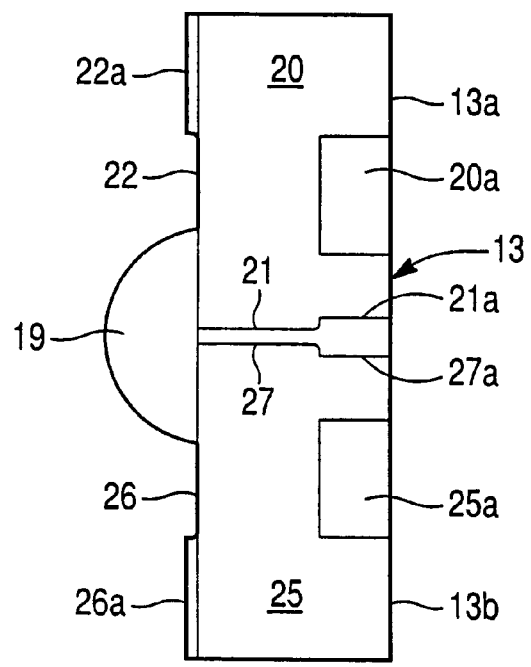
FIG. 6 is a frontal view of the present invention.

Referring to FIGS. 4–6, the set-up gage 10 has a pinion stem 11. The pinion stem 11 has a plurality of precision ground, polished steel sections 12. When the set-up gage 10 is used in conjunction with a gear tester (not shown), the precision ground sections 12 correspond with precision ground surfaces of the tooling collet, laterally spaced, within the gear tester to support the set-up gage 10. The precision ground sections 12 are essentially cylindrical.

Located forward of the pinion stem 11 is a set-up gage body 13 including an above center set-up gage body 13a for an above center hypoid gear 8a and a below center set-up gage body 13b for a below center hypoid gear 8b. Preferably, the hypoid gears 8a or 8b are simulated hypoid ring gears. The pinion stem is truncated at face 19 to allow the gage body 13 proper clearance to position the simulated hypoid gear 8a or 8b.

Figure 7:
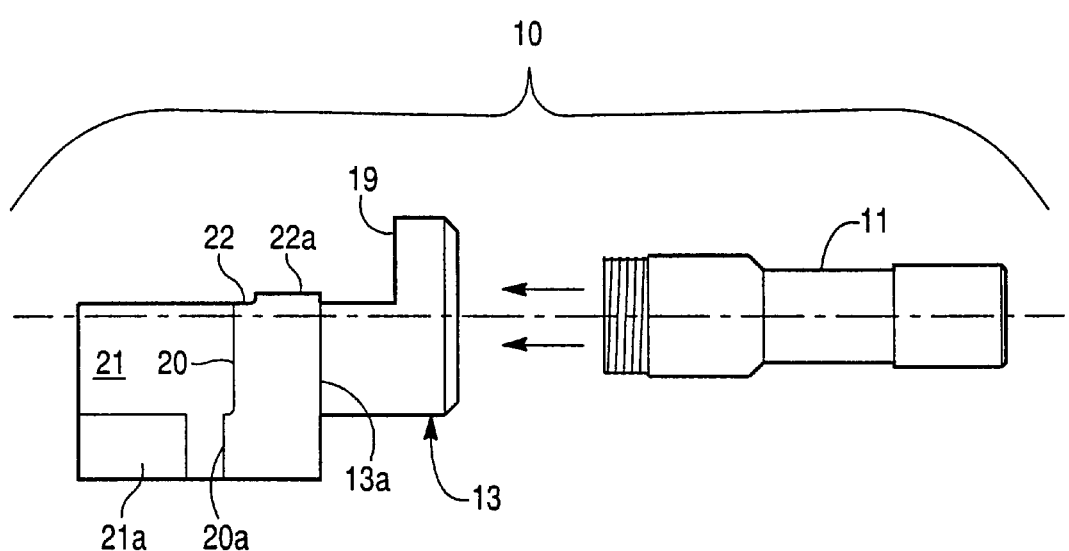
FIG. 7 is an exploded side view of the alternative embodiment of present invention.

In the preferred embodiment, the pinion stem 11 is manufactured directly with the set-up gage body 13 from the same blank of material. However, pinion shaft widths vary depending on manufacturing requirements, thus the pinion stem 11 must also vary in accordance with the intended pinion shaft width. Thus, in an alternate embodiment, the pinion stem 11 and the set-up gage body 13 are separate sections that are fixed firmly to each other during use. This arrangement permits the flexibility of interchanging pinion stems of varying sizes with set-up gage bodies, also of varying sizes. Now, a variable pinion stem 11 may be used depending on intended size of the pinion shaft for which the set-up gage is intended to be used in conjunction with. The specifics surrounding the mechanism used to connect the pinion stem to that of the gage body is not critical to this aspect of the invention. For example, the pinion stem may be threaded with male threads to engage a female threaded aperture with the gage body as illustrated in FIG. 7. Similarly, the opposite arrangement could also be used; wherein the gage body has a stem that is externally threaded to engaged an aperture that in internally threaded within the pinion stem. Any means known to those skilled in the art may be employed to allow the pinion stem to detach from the gage body so long as the design tolerances are met.

The above center set-up gage body 13a has orthogonal surfaces 20, 21, and 22 for properly setting the distances from which a gear arrangement wherein the pinion drive gear is positioned above a centerline of the hypoid ring gear within the gear tester. The set up distances may vary depending on requirements for each independent gear combination.

The below center set-up gage body 13b has orthogonal surfaces 25, 26, and 27 for properly setting the distances from which a gear arrangement wherein the pinion drive gear is positioned below the center line of the ring gear within the gear tester. Here again, the set up distances may vary depending on requirements for each independent gear combination. While in the preferred embodiment, the surfaces are indicated as being orthogonal with respect to one another they may be oriented at angles other than a right angle, as this is not an essential design requirement of the invention.

Both sets of orthogonal surfaces 20, 21, 22, 25, 26, and 27 set the proper distance for spacing of the gear tester and lapper in the x, y and z directions.

Extreme precision is required when arranging the proper set up distances. In the preferred embodiment of the present invention, pads are secured to the orthogonal surfaces 20, 21, 22, 25, 26, and 27 to ensure the set-up distances are proper. The pads are numbered on the drawings as 20a, 21a, 22a, 25a, 26a, and 27a. The number for each corresponding pad indicated on the drawings is the reference number associated with the particular surface 20, 21, 22, 25, 26, and 27 onto which that pad is secured. The pads are hereinafter referred to without any specific reference numeral, as all the pads exhibit the same qualities. In the embodiment shown in FIGS. 4–6, the pads are formed unitary with the orthogonal surfaces 20, 21, 22, 25, 26, and 27 as a single piece. In an alternate embodiment, the pads are constructed separate from the gage body 13. The pads are then secured to the gage body in the appropriate locations. The pads may be secured by any means known to those skilled in the art. An example of which may be using bolts to secure the pads. The bolt head would be recessed within the pad, so as not to affect the placement of the set-up gage 10 on the gear tester and lapper. The pads vary in size depending on the particular arrangement of the pinion drive gear and the ring gear. Similarly, should a pad become damaged whether in storage or during operation, the damaged pad is removed and another pad is secured to the face. This eliminates the need to mold or craft another set-up gage for varying gear arrangements.

In another embodiment, the set-up distances are machined to the gage body's surfaces during manufacturing of the set-up gage. This eliminates the use of pads entirely.

What is claimed is:

1. A set-up gage for performing a machine set-up for both above and below center hypoid gear designs, said set-up gage comprising:

a gage body; and a pinion stem, said pinion stem integrally attached to said gage body;

said gage body providing a first set of surfaces and a second set of surfaces, each of said sets of surfaces contacting and positioning a hypoid gear relative to said pinion stem.

2. The set-up gage according to claim 1, wherein said first set and said second set have surfaces that are mutually orthogonal.

3. The set-up gage according to claim 1, wherein said first set of surfaces positions said hypoid gear above a centerline of said pinion stem.

4. The set-up gage according to claim 1, wherein said second set of surfaces positions said hypoid gear below a centerline of said pinion stem.

5. The set-up gage according to claim 1, wherein said pinion stem has at least one precision ground bearing surface.

6. The set-up gage according to claim 1, wherein said first set of surfaces and said second set of surfaces further comprise a plurality of pads.

7. The set-up gage according to claim 6, wherein said pads are unitarily formed with said first and said second set of surfaces as a single piece.

8. The set-up gage according to claim 1, wherein said pinion stem and said gage body are unitarily formed as a single piece.

9. The set-up gage according to claim 1, wherein said pinion stem and said gage body are interchangeably connected with one another.

10. The set-up gage according to claim 1, wherein said first and said second sets of surfaces position said hypoid gear in one of a plurality of positions.

11. A hypoid gear set testing assembly comprising:
   a simulated hypoid gear; and
   set up gage, said set up gage including
      a pinion stem; and a
      a gage body having a first and second set of surfaces, wherein said first set of surfaces engages said simulated hypoid gear together simulating an above center engaged hypoid gear set and said second set of surfaces engages said simulated hypoid gear together simulating a below center engaged hypoid gear set.

12. The set-up gage according to claim 2, wherein said first and said second sets of mutually orthogonal surfaces position said hypoid gear in one of a plurality of positions.

13. The set-up gage according to claim 1, wherein said hypoid gear is a ring gear.

* * * * *